US010290891B2

(12) United States Patent
Kreiner et al.

(10) Patent No.: US 10,290,891 B2
(45) Date of Patent: May 14, 2019

(54) METAL-HALOGEN FLOW BATTERY BIPOLAR ELECTRODE ASSEMBLY, SYSTEM, AND METHOD

(71) Applicant: PRIMUS POWER CORPORATION, Hayward, CA (US)

(72) Inventors: Paul Kreiner, San Francisco, CA (US); Simo Alberti, San Luis Obispo, CA (US); Kyle Haynes, Redwood City, CA (US); Timothy Bekkedahl, Sunnyvale, CA (US); Andrew Choi, Hayward, CA (US); Tom Stepien, Portola Valley, CA (US)

(73) Assignee: PRIMUS POWER CORPORATION, Hayward, CA (US)

( * ) Notice: Subject to any disclaimer, the term of this patent is extended or adjusted under 35 U.S.C. 154(b) by 377 days.

(21) Appl. No.: 15/010,241

(22) Filed: Jan. 29, 2016

(65) Prior Publication Data
US 2017/0222246 A1    Aug. 3, 2017

(51) Int. Cl.
*H01M 8/026*     (2016.01)
*H01M 8/18*      (2006.01)
(Continued)

(52) U.S. Cl.
CPC ......... *H01M 8/188* (2013.01); *H01M 4/8631* (2013.01); *H01M 4/8657* (2013.01);
(Continued)

(58) Field of Classification Search
CPC .............................. H01M 8/026; H01M 8/188
(Continued)

(56) References Cited

U.S. PATENT DOCUMENTS

| 3,644,190 A | 2/1972 | Weist et al. |
| 3,713,888 A | 1/1973 | Symons |

(Continued)

FOREIGN PATENT DOCUMENTS

| CN | 103262336 A | 8/2013 |
| JP | 63-314782 A | 12/1988 |

(Continued)

OTHER PUBLICATIONS

International Search Report and Written Opinion from the International Searching Authority for International Application No. PCT/US2017/015101, dated May 17, 2017, 18 pages.
(Continued)

*Primary Examiner* — Jonathan G Leong
(74) *Attorney, Agent, or Firm* — The Marbury Law Group PLLC (57) ABSTRACT

Metal-halogen flow battery cell, stack, system, and method, the stack including flow battery cells that each include an impermeable first electrode, an insert disposed on the first electrode and comprising sloped channels, a cell frame disposed around the insert and including a cell inlet manifold configured to provide a metal halide electrolyte and an opposing cell outlet manifold configured to receive the electrolyte, a porous second electrode disposed on the insert, such that sloped separation zones are formed between the second electrode and the channels, conductive connectors electrically connecting the first and second electrodes, and ribs disposed on the second electrode and extending substantially parallel to the channels of the insert. A depth of the channels increases as proximity to the cell outlet manifold increases.

23 Claims, 7 Drawing Sheets

(51) Int. Cl.
*H01M 8/2404* (2016.01)
*H01M 4/86* (2006.01)
*H01M 8/04276* (2016.01)
*H01M 8/20* (2006.01)
*H01M 8/0258* (2016.01)
*H01M 8/0273* (2016.01)

(52) U.S. Cl.
CPC ......... *H01M 8/026* (2013.01); *H01M 8/0258* (2013.01); *H01M 8/0273* (2013.01); *H01M 8/04276* (2013.01); *H01M 8/20* (2013.01); *H01M 8/2404* (2016.02); *H01M 2004/8694* (2013.01); *H01M 2250/10* (2013.01); *H01M 2300/002* (2013.01); *Y02E 60/528* (2013.01)

(58) Field of Classification Search
USPC ...................................................... 429/70, 51
See application file for complete search history.

(56) References Cited

U.S. PATENT DOCUMENTS

| | | | |
|---|---|---|---|
| 3,773,561 A | 11/1973 | Bjorkman | |
| 3,813,301 A | 5/1974 | Carr | |
| 3,909,298 A | 9/1975 | Carr | |
| 3,935,024 A | 1/1976 | Symons | |
| 3,940,283 A | 2/1976 | Symons | |
| 3,954,502 A | 5/1976 | Symons et al. | |
| 3,993,502 A | 11/1976 | Bjorkman, Jr. | |
| 4,001,036 A | 1/1977 | Berman et al. | |
| 4,020,238 A | 4/1977 | Symons | |
| 4,025,697 A | 5/1977 | Hart | |
| 4,068,043 A | 1/1978 | Carr | |
| 4,071,660 A | 1/1978 | Hart | |
| 4,072,540 A | 2/1978 | Symons et al. | |
| 4,086,393 A | 4/1978 | Hart | |
| 4,100,332 A | 7/1978 | Carr | |
| 4,115,529 A | 9/1978 | Behling | |
| 4,127,701 A | 11/1978 | Symons et al. | |
| 4,146,680 A | 3/1979 | Carr et al. | |
| 4,162,351 A | 7/1979 | Putt et al. | |
| 4,200,684 A | 4/1980 | Bro | |
| 4,257,867 A | 3/1981 | Hammond et al. | |
| 4,273,839 A | 6/1981 | Carr et al. | |
| 4,287,267 A | 9/1981 | Whittlesey et al. | |
| 4,306,003 A | 12/1981 | Henriksen | |
| 4,307,159 A | 12/1981 | Hammond et al. | |
| 4,320,179 A | 3/1982 | Hart | |
| 4,371,825 A | 2/1983 | Chi et al. | |
| 4,413,042 A | 11/1983 | Carr | |
| 4,414,292 A | 11/1983 | Kiwalle et al. | |
| 4,415,847 A | 11/1983 | Galloway | |
| 4,482,614 A | 11/1984 | Zito, Jr. | |
| 4,518,663 A | 5/1985 | Kodali et al. | |
| 4,518,664 A | 5/1985 | Whittlesey et al. | |
| 4,521,497 A | 6/1985 | Tamminen | |
| 4,534,833 A | 8/1985 | Carr et al. | |
| 4,567,120 A | 1/1986 | Jorne et al. | |
| 4,678,656 A | 7/1987 | Bjorkman, Jr. et al. | |
| 4,728,587 A | 3/1988 | Horie et al. | |
| 4,746,585 A | 5/1988 | Stoner et al. | |
| 4,766,045 A | 8/1988 | Bellows et al. | |
| 5,695,889 A | 12/1997 | Harbauer et al. | |
| 8,202,641 B2 | 6/2012 | Winter et al. | |
| 8,450,001 B2 | 5/2013 | Kell et al. | |
| 8,945,739 B2 | 2/2015 | Cole et al. | |
| 9,130,217 B2 | 9/2015 | Cole et al. | |
| 2004/0169493 A1 | 9/2004 | Tsutsui et al. | |
| 2004/0234834 A1 | 11/2004 | Narayanan et al. | |
| 2004/0234843 A1 | 11/2004 | Skyllas-Kazacos | |
| 2005/0181273 A1 | 8/2005 | Deguchi et al. | |
| 2005/0244707 A1 | 11/2005 | Skyllas-Kazacos | |
| 2009/0239131 A1 | 9/2009 | Winter | |
| 2010/0021805 A1 | 1/2010 | Winter | |
| 2010/0323264 A1 | 12/2010 | Chiang et al. | |
| 2011/0070468 A9 | 3/2011 | Winter | |
| 2011/0223451 A1 | 9/2011 | Winter et al. | |
| 2012/0052340 A1 | 3/2012 | La O' et al. | |
| 2012/0328910 A1 | 12/2012 | La O' et al. | |
| 2013/0266829 A1 | 10/2013 | Cole et al. | |
| 2014/0093804 A1 | 4/2014 | Kreiner et al. | |
| 2015/0147666 A1 | 2/2015 | Cole | |
| 2015/0086882 A1* | 3/2015 | Tsukada ................ H01M 2/024 429/405 |
| 2015/0125768 A1 | 5/2015 | Mosso et al. | |

FOREIGN PATENT DOCUMENTS

| | | |
|---|---|---|
| JP | 02-010671 A | 1/1990 |
| JP | 07-065871 A | 3/1995 |
| JP | 07-153478 A | 6/1995 |
| JP | 2001-216995 A | 8/2001 |
| WO | WO 2008/089205 A2 | 7/2008 |
| WO | WO 2011/011533 A2 | 1/2011 |
| WO | WO2013003233 A2 | 1/2013 |
| WO | WO-2013125444 A1 * | 8/2013 ............ H01M 2/024 |

OTHER PUBLICATIONS

Symons, Philip C., "Advanced Technology Zinc/Chlorine Batteries for Electric Utility Load Leveling," 19$^{th}$ Intersociety Energy Conversion Engineering Conf., 1984, vol. 2, 857-862.

EPRI Report, EM-1051 (parts 1-3), Apr. 1979, Electric Power Research Institute.

International Preliminary Report on Patentability received in connection with international application No. PCT/US2012/043805; dated Jan. 16, 2014.

International Search Report & Written Opinion issued in PCT Application No. PCT/US2012/043805, dated Jan. 23, 2013.

International Search Report received in connection with international application No. PCT/US2013/031952; dated Jun. 28, 2013.

International Preliminary Report on Patentability and Written Opinion of the International Searching Authority from the International Bureau for International Application No. PCT/US2017/015101, dated Aug. 9, 2018, 14 pages.

* cited by examiner

METAL-HALOGEN FLOW BATTERY BIPOLAR ELECTRODE ASSEMBLY, SYSTEM, AND METHOD

FIELD

The present invention is directed to flow battery electrochemical systems and methods of using same.

BACKGROUND

The development of renewable energy sources has revitalized the need for large-scale batteries for off-peak energy storage. The requirements for such an application differ from those of other types of rechargeable batteries such as lead-acid batteries. Batteries for off-peak energy storage in the power grid generally are required to be of low capital cost, long cycle life, high efficiency, and low maintenance.

One type of electrochemical energy system suitable for such an energy storage is a so-called "flow battery" which uses a halogen component for reduction at a normally positive electrode in discharge mode, and an oxidizable metal adapted to become oxidized at a normally negative electrode during the normal operation of the electrochemical system. An aqueous metal halide electrolyte is used to replenish the supply of halogen component as it becomes reduced at the positive electrode. The electrolyte is circulated between the electrode area and a reservoir area. One example of such a system uses zinc as the metal and chlorine as the halogen.

Such electrochemical energy systems are described in, for example, U.S. Pat. Nos. 3,713,888, 3,993,502, 4,001,036, 4,072,540, 4,146,680, and 4,414,292, and in EPRI Report EM-I051 (Parts 1-3) dated April 1979, published by the Electric Power Research Institute, the disclosures of which are hereby incorporated by reference in their entirety.

Typical conventional flow batteries contain separate flow loops and pumps for the anode and cathode. In addition, the two electrodes need to be separated by a barrier such as a membrane, which needs to be replaced over time. This separation of cathode and anode leads to high manufacturing and maintenance costs, but without this separation, the cell is susceptible to high auto-discharge, resulting in much lower energy output and efficiency.

SUMMARY

Exemplary embodiments of the present disclosure relate to a flow battery bipolar electrode assembly comprising: an impermeable first electrode; an insert disposed on the first electrode and comprising sloped channels; a cell frame disposed around the insert and comprising a cell inlet manifold configured to provide a metal halide electrolyte and an opposing cell outlet manifold configured to receive the electrolyte; a porous second electrode disposed on the insert such that sloped separation zones are formed between the second electrode and the channels; connectors electrically connecting the first and second electrodes; and ribs disposed on the second electrode and extending substantially parallel to the channels of the insert. A depth of the channels increases as proximity to the cell outlet manifold increases.

Exemplary embodiments of the present disclosure relate to a flow battery bipolar electrode assembly comprising: an insert comprising junction holes; an impermeable first electrode disposed under the insert; a porous second electrode disposed over the insert and comprising junction holes that overlap with the junction holes of the insert; a cell frame disposed around the insert and comprising a cell inlet manifold configured to provide a metal halide electrolyte and an opposing cell outlet manifold configured to receive the electrolyte; and corrugated connectors disposed on the second electrode and contacting the first electrode through the overlapped junction holes of the insert and second electrode, such that the first and second electrodes are electrically connected.

Exemplary embodiments of the present disclosure relate to a method of forming a flow battery bipolar electrode assembly, the method comprising: positioning an insert between an impermeable first electrode and a porous second electrode, such that junction holes in the second electrode overlap with junction holes formed in the insert; and electrically connecting upper surfaces of the first and second electrodes using a corrugated connector that extends through the overlapped junction holes.

DETAILED DESCRIPTION

Embodiments of the present invention are drawn to metal-halogen flow battery systems and methods of using these systems. The systems include flow architecture with a single flow circuit. Conventional metal halogen flow batteries maintain electrochemical efficiency by keeping reactant streams contained in two distinct flow loops by using a separator between the positive and negative electrodes of each flow cell and separate reservoirs for the electrolyte and the halogen reactant. The configurations below describe systems and methods for reactant handling that combine the simplicity and reliability of a single flow loop system with reactant separation balance of plant (BOP) components. Preferably, the single flow loop system includes a stack of flow battery cells without a separator between the positive and negative electrodes of each flow cell (i.e., the reaction zone is not partitioned) and a common reservoir for the electrolyte and the concentrated halogen reactant.

The electrochemical (e.g., flow battery) system can include a vessel containing one or more electrochemical cells (e.g., a stack of flow battery cells) in its inner volume, a metal-halide electrolyte, and a flow circuit configured to deliver the metal-halide electrolyte to the electrochemical cell(s). The flow circuit may be a closed loop circuit that is configured to deliver the electrolyte to and from the cell(s). In many embodiments, the loop circuit may be a sealed loop circuit.

Each of the electrochemical cell(s) may comprise a first electrode, which may serve as a negative electrode, a second electrode, which may serve as a positive electrode, and a reaction zone between the electrodes. The first and second electrodes may be formed of a non-permeable metal or carbon material, such as coated steel, graphite, titanium, tantalum, an/or niobium. The second electrode may be a porous electrode that includes through holes in a non-permeable material. The second electrode may be coated with ruthenium oxide (e.g., ruthenized titanium). The second electrode may have a roughened surface. In discharge and charge modes, the second electrode may serve as a positive electrode at which the halogen may be reduced into halogen ions.

The first electrode may be a non-porous electrode that serves as a negative electrode on which a metal (e.g., zinc) is plated and deplated. The first electrode may comprise a primary depositable and oxidizable metal, i.e., a metal that may be oxidized to form cations during the discharge mode. For example, the first electrode may comprise a metal that is of the same type as a metal ion in one of the components of the metal halide electrolyte. For example, when the metal halide electrolyte comprises zinc halide, such as zinc chloride and/or zinc bromide, the first electrode may comprise metallic zinc. Alternatively, the first electrode may comprise another material, such as titanium that is plated with zinc during operation.

The reaction zone lacks a separator and an electrolyte circulates through the same flow path (e.g., single loop) without a separation between the electrodes in each cell. In other words, the reaction zone may be such that it does not contain a membrane or a separator between the positive and negative electrodes of the same cell that is impermeable to the halogen ions in the electrolyte. Furthermore, the cell may be a hybrid flow battery cell rather than a redox flow battery cell. Thus, in the hybrid flow battery cell, a metal, such as zinc is plated onto one of the electrodes (e.g., the first electrode), the reaction zone lacks an ion exchange membrane which allows ions to pass through it (i.e., there is no ion exchange membrane between the cathode and anode electrodes) and the electrolyte is not separated into a catholyte and anolyte by the ion exchange membrane. The electrolyte is stored in one reservoir rather than in separate catholyte and anolyte reservoirs.

According to various embodiments, provided is a flow battery system that may be reversible, i.e., capable of working in both charge and discharge operation mode. The reversible system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. Preferably, the electrolyte is aqueous solution of at least one metal halide electrolyte compound, such as $ZnBr_2$ and/or $ZnCl_2$. For example, the solution may be a 15-50% aqueous solution of $ZnBr_2$ and/or $ZnCl_2$, such as a 25% solution. In certain embodiments, the electrolyte may contain one or more additives, which can enhance the electrical conductivity of the electrolytic solution. For example, when the electrolyte contains $ZnCl_2$, such additive can be one or more salts of sodium or potassium, such as NaCl or KCl. Alternatively, the electrolyte may contain a plating enhancer such as Pb, Bi, or compounds thereof.

When the electrolyte contains $ZnBr_2$, then the electrolyte may also contain a bromine sequestering/complexing agent. For example, the bromine sequestering agent may be one or more of a morpholinium, pyrrolidinium, imidazolium, picolinium or pyridinium salt, and a quaternary ammonium bromide (QBr). In some embodiments, the bromine sequestering agent may be at least one of 1-dodecyl-1-methylmorpholinium bromide, 1-dodecyl-1-methylpyrrolidinium bromide, 1-dodecylpyridinium bromide, dodecyltrimethylammonium bromide, benzyldodecyldimethylammonium bromide, tetrabutylammonium bromide, 1-ethyl-1-methylpyrrolidinium bromide (MEP), and 1-ethyl-1-methyl-morpholinium bromide (MEM). In an embodiment, these compounds include any substitution derivatives of the compounds listed (e.g., those containing additional alkyl substituents) as well as different alkyl chain lengths. Preferably, the electrolyte composition includes about 7-27% (w/v) of the bromine sequestering agent. More preferably, the electrolyte composition includes about 14-23% (w/v) of the bromine sequestering agent.

Without wishing to be bound to any particular theory, it is believed the bromine sequestering agent allows the electrolyte to form a biphasic mixture including a first phase and a second phase disposed below the first phase. The first phase may be an aqueous phase including a lighter metal-halide electrolyte (e.g., aqueous zinc bromide). The second phase may be a non-aqueous phase that includes a concentrated halogen reactant (e.g., sequestered bromine). As used herein, a "concentrated halogen reactant" may include electrolyte with higher than stoichiometric halogen content (e.g., higher halogen content than 1:2 zinc to halogen ratio for zinc-halide electrolyte), pure liquid halogen (e.g., liquid chlorine and/or bromine), or chemically-complexed halogen, such as a bromine-MEP or another bromine-organic molecule complex.

Figure 1A:
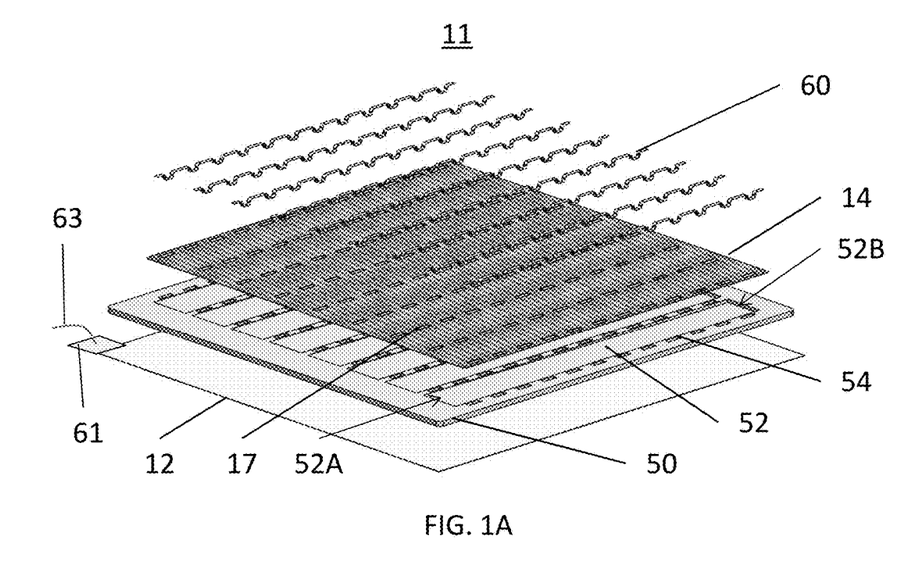
FIG. 1A is an exploded view of a bipolar electrode of a flow battery cell, according to various embodiments of the present disclosure.
Figure 1B:
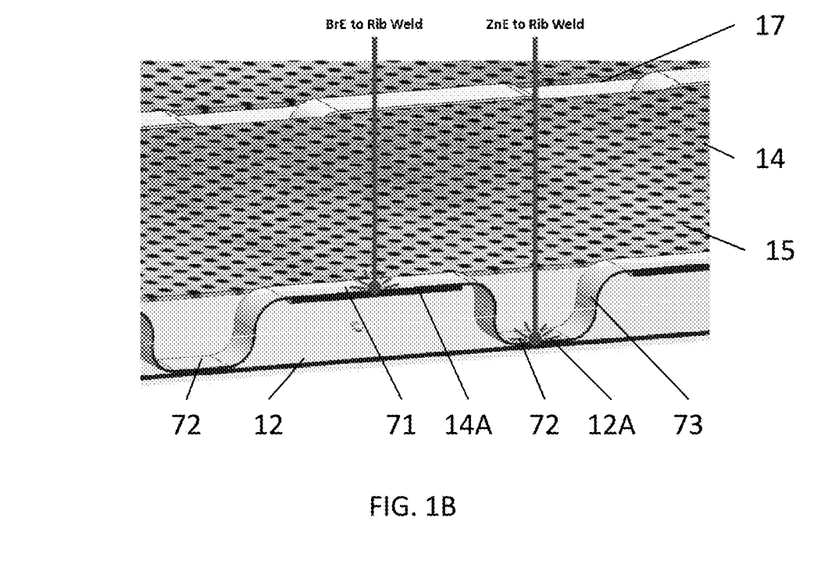
FIG. 1B is a sectional perspective view of a portion of the bipolar electrode of FIG. 1A, when assembled.

FIG. 1A is an exploded view of a bipolar electrode assembly 11 of a flow battery cell, according to various embodiments of the present disclosure. FIG. 1B is a sectional perspective view of a portion of the bipolar electrode assembly 11, when assembled.

Referring to FIGS. 1A and 1B, the bipolar electrode assembly 11 includes a first electrode 12, a second electrode 14, a sloped insert 50 disposed therebetween, and conductive connectors 60. Herein, for convenience, the first electrode 12 may be referred to as a negative electrode 12, and the second electrode 14 may be referred to as a positive electrode 14. The first electrode 12 may be formed of a sheet of an impermeable metal or carbon material having a substantially uniform thickness. For example, the first electrode 12 may include coated steel, graphite, titanium, tantalum, and/or niobium. The first electrode 12 may have a roughened surface to increased plating adhesion. In each bipolar electrode assembly 11, the second electrode 14 forms a bottom electrode of one cell, and the first electrode 12 forms a top electrode of an underlying cell.

A voltage sensor tab 61 may be connected to the first electrode 12, and a voltage sensor wire 63 may be connected to the voltage tab 61. The voltage wire 63 may be connected to an external voltage meter to measure the voltage in the cell. The tab 61 and the wire 63 may be formed of Ti.

The second electrode 14 may be a perforated sheet or screen of a metal material having a substantially uniform thickness. For example, the second electrode 14 may include coated steel, titanium, tantalum, and/or niobium. The second electrode 14 may have through holes 15 extending there through, from upper to lower surfaces of the second electrode 14. In other words, the through holes 15 may extend entirely though the thickness of the second electrode 14. The second electrode 14 may also include junction holes 17. The second electrode 14 may be coated with a mixed-metal oxide that may operate as a catalyst. For example, the second electrode 14 may be a perforated Ti plated coated with a layer of ruthenium oxide (e.g., ruthenized titanium). Thus, the first and second electrodes 12, 14 may respectively comprise non-porous and porous Ti electrodes.

The insert 50 may be formed of a dielectric (i.e., electrically insulating) material, such as a polymeric dielectric material or a moldable dielectric material. For example, the insert 50r may be formed of high density polyethylene (HDPE) polypropylene, PVDF, Teflon, or the like. The insert 50 may include sloped channels 52 and junction holes 54. The sloped channels 52 may each include a relatively shallow end 52A and a relatively deep end 52B. The junction holes 54 may be aligned with (e.g., overlap with) the junction holes 17 of the second electrode 14.

The conductive connectors 60 may be corrugated strips and may be formed of an electrically conductive material. Accordingly, the conductive connectors 60 may electrically connect the first and second electrodes 12, 14. For example, the conductive connectors 60 may be formed of coated steel, titanium, tantalum, and/or niobium. The corrugated structure allows portions of the conductive connectors 60 to extend into the overlapped junction holes 17 and 54 of the second electrode 14 and the insert 50, respectively. In particular, each conductive connector 60 includes upper contact regions 71 and lower contact regions 72 that are connected by bent regions 73. The upper and lower contact regions 71, 72 are flat and relatively long. The upper contact regions 71 may be disposed on the upper surface of the second electrode 14, and the lower contact regions 72 may be disposed on the upper surface of the first electrode 12.

In particular, the upper contact regions 71 may be welded (e.g., stake welded) to contact regions 14A of the second electrode 14 that are disposed between the junction holes 17 thereof, thereby electrically connecting the connector 60 and the second electrode 14. The lower contact regions 72 may be welded (e.g., stake welded) to contact regions 12A of the first electrode 12 that face (e.g., are exposed by) the junction holes 54 of the insert 50, thereby electrically connecting the connector 60 and the first electrode 12. The contact regions 14A of the second electrodes 14 may be disposed on portions of the insert 50 disposed between the junction holes 17. The bent regions 73 may extend through corresponding pairs of overlapped junction holes 17, 54. The above configuration allows for the welding to be accomplished by positioning a welding device on only one side of the assembly 11, e.g., by stake welding through contact region 71 and second electrode 14, and by stake welding through contact region 72 and the first electrode 12 through the overlapping junction holes 17, 14.

Therefore, the welding can be performed in the same setup, which results in less handling and cycle time during welding. Further, the conductive connectors 60 may be relatively thin, which allows for a reduction in the amount of Ti included in the connectors 60, while still providing acceptable weld strength, due to the contact surfaces 71, 72 and the flexibility of the conductive connectors 60. In other words, the connectors 60 are compliant enough to deform to the position of the electrodes 12, 14, which allows for overall assembly tolerances to be maintained despite looser tolerances for the conductive connectors 60. Therefore manufacturing costs may also be reduced.

In addition, this configuration does not require a sealing rim to prevent electrolyte bypass flow. In particular, the second electrodes 14 are substantially more permeable than conventional sintered electrodes, which allows for a reduction in a flow pressure gradient that drives bypass flow. The first electrodes 12 are also fastened to the inserts 50 via the welding of the connectors 60 to the electrodes 12 and 14, which provides close contact between the first electrodes and the inserts 50. As a result, mechanical seals are formed that minimize bypass flow without the need for a conventional elastomeric seal.

Figure 2A:
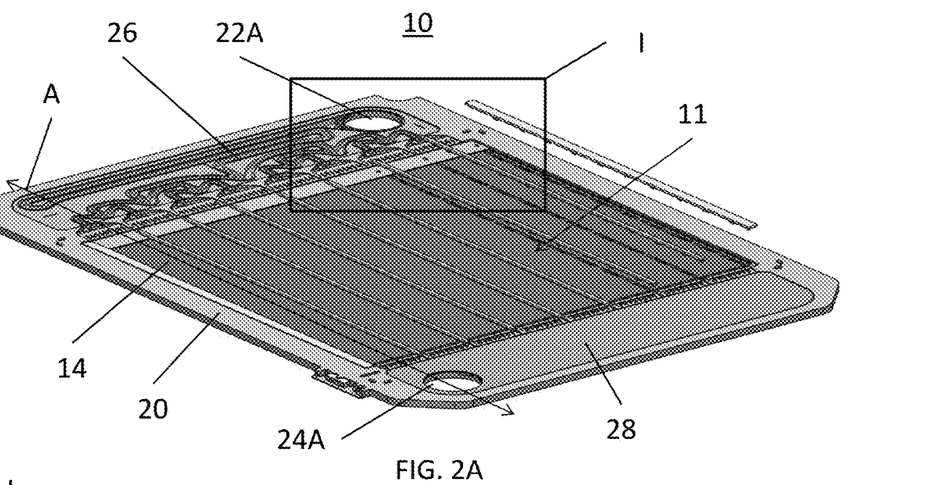
FIG. 2A is a partially exploded, top perspective view of a flow battery cell 10 including the bipolar electrode of FIGS. 1A and 1B, according to various embodiments of the present disclosure.
Figure 2B:
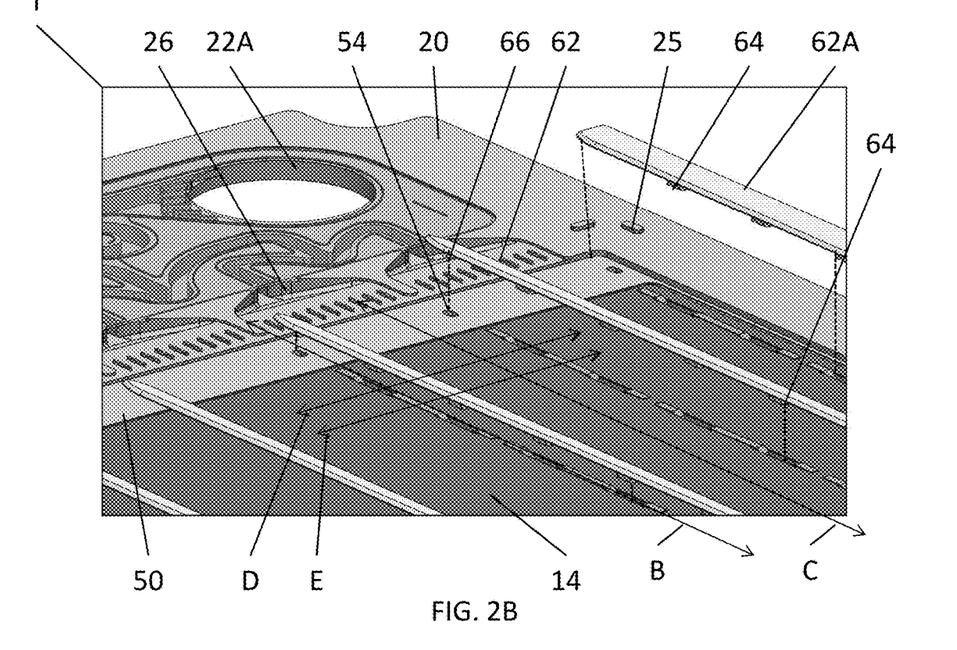
FIG. 2B is a top perspective view of portion I of FIG. 2A.

FIG. 2A is a partially exploded, top perspective view of a flow battery cell 10 including the bipolar electrode assembly 11 of FIGS. 1A and 1B, according to various embodiments of the present disclosure. FIG. 2B is a top perspective view of portion I of FIG. 2A.

Referring to FIGS. 1A, 2A and 2B, the flow battery cell 10 includes a cell frame 20 that may be disposed around and configured to support the bipolar electrode assembly 11. The cell frame 20 may include a stack inlet conduit hole 22A and a cell inlet manifold 26 fluidly connected thereto. The cell frame 20 may also include a stack outlet conduit hole 24A and cell outlet manifold 28 fluidly connected thereto. The holes 22A, 24B may be disposed at non-adjacent corners of the cell frame 20. The cell inlet manifold 26 may provide a torturous pathway for electrolyte flow. The cell outlet manifold 28 may be an open recess formed in the cell frame 20. The relatively shallow ends 52A of the channels 52 may be disposed adjacent to the cell inlet manifold 26, and the relatively deep ends 52B of the channels 52 may be disposed adjacent to the cell outlet manifold 28. The cell frame 20 may be configured to be stacked with other cell frames, as discussed below. For example, the cell frame 20 may include protrusions 25 configured to separate adjacent cell frames 20.

The flow battery cell 10 may include support ribs 62 that include posts 64. The posts 64 may be inserted into the junction holes 17 of the second electrode 14 and into recessed portions of the conductive connectors 60 disposed in junction holes 54 disposed between the flow channels 52 in the insert 50. As such, the ribs 62 may extend substantially parallel to and between the channels 52 of the insert 50. In other words, the ribs 62 may be disposed so as not to vertically overlap the channels 52. The ribs 62 may be formed of a dielectric material, such as a polymer or moldable material. As discussed below the ribs 62 may physically separate the first and second electrodes 12, 14 of flow battery cells 10. The ribs 62 may be configured to form electrolyte flow channels in a reaction zone formed between the first and second electrodes 12, 14 of each cell 10 in a flow battery stack. The outermost two ribs 62A may be wider than the ribs 62 disposed therebetween, in order to fully overlap opposing outer edges of the second electrode 14, and/or provide additional support to edges of the cells 10 during stack compression. The outermost two ribs 62A may also be configured to prevent electrolyte from escaping from sides of the flow battery cell 10. Since the outermost ribs 62A are not molded elements of the cell frame 20, manufacturability is improved, since the zinc plating interface is decoupled from the relatively complicated cell frame 20. The ribs 62 may also include end posts 66 that are inserted into junction holes 54 of the insert 50. The posts 64, 66 prevent the ribs 62 from bowing. As such, plating problems related to bowed ribs may be prevented.

Figure 3A:
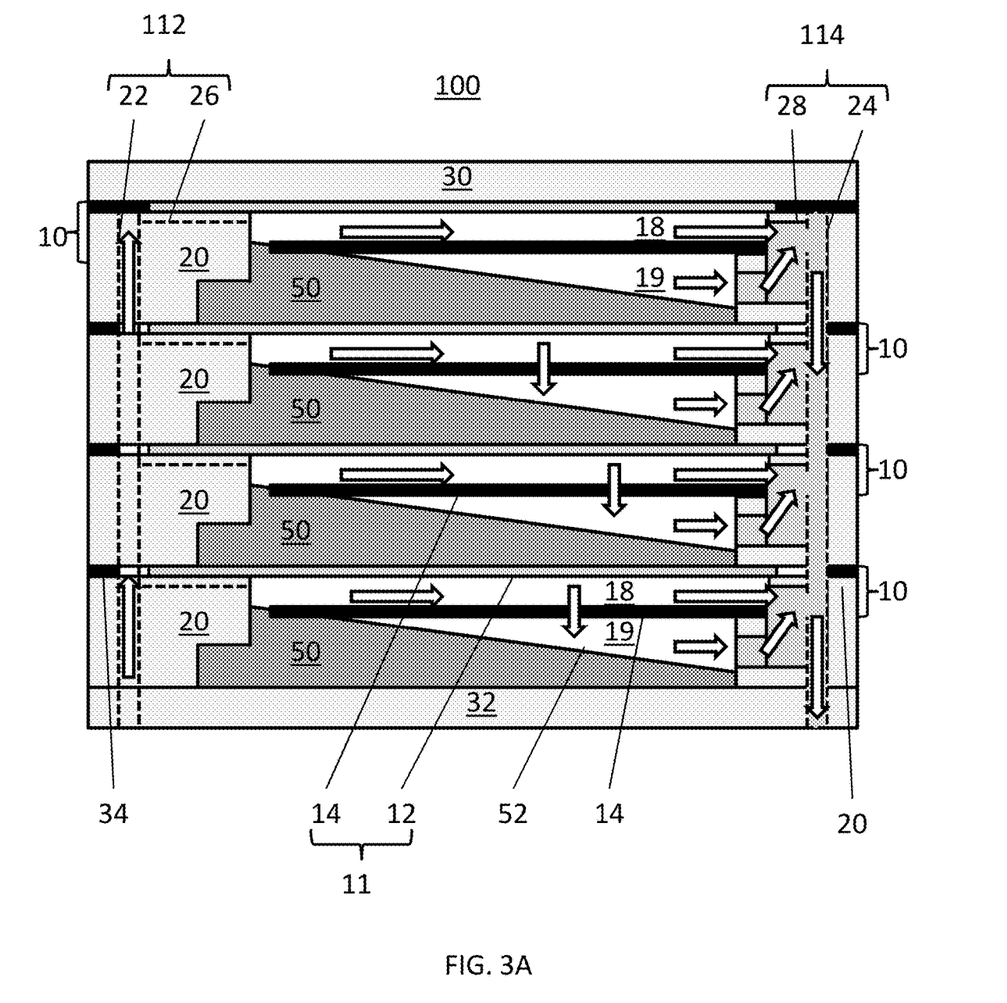
FIG. 3A is a schematic vertical cross-sectional view of a stack of the flow battery cells taken along line A in FIG. 2A, according to various embodiments of the present disclosure.
Figure 3B:
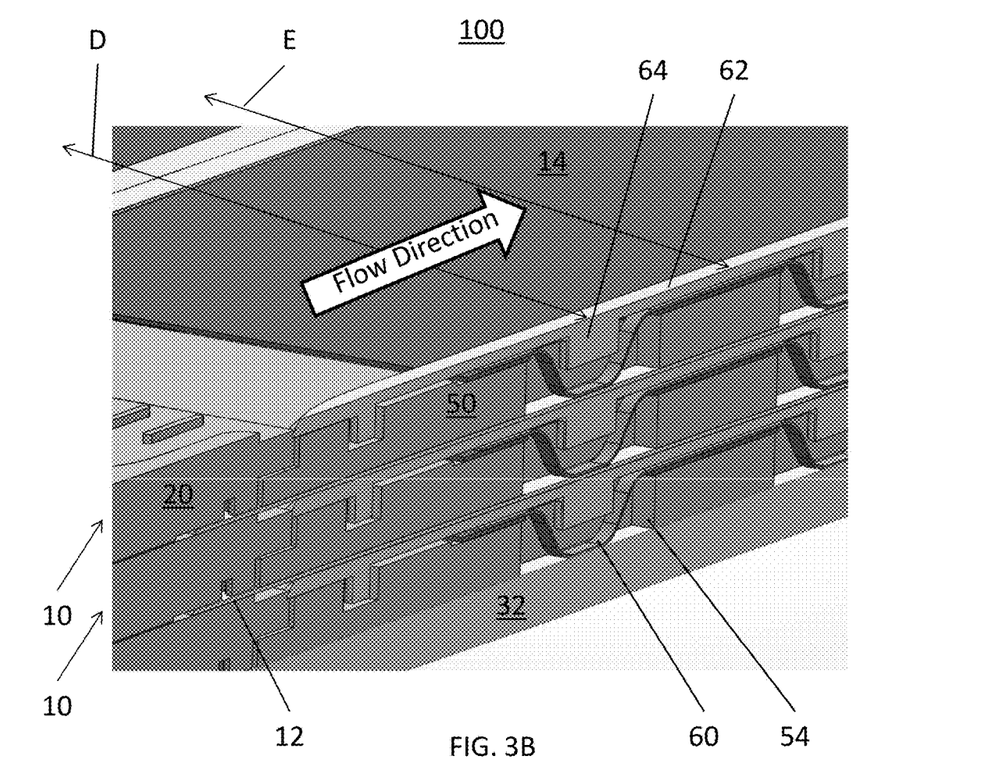
FIG. 3B is a sectional view taken along line B in FIG. 2B parallel to an electrolyte flow direction and through ribs of the stack, and FIG. 3C partial sectional view taken along line C in FIG. 2B parallel to an electrolyte flow direction in a reaction zone between adjacent ribs of the stack.
Figure 3C:
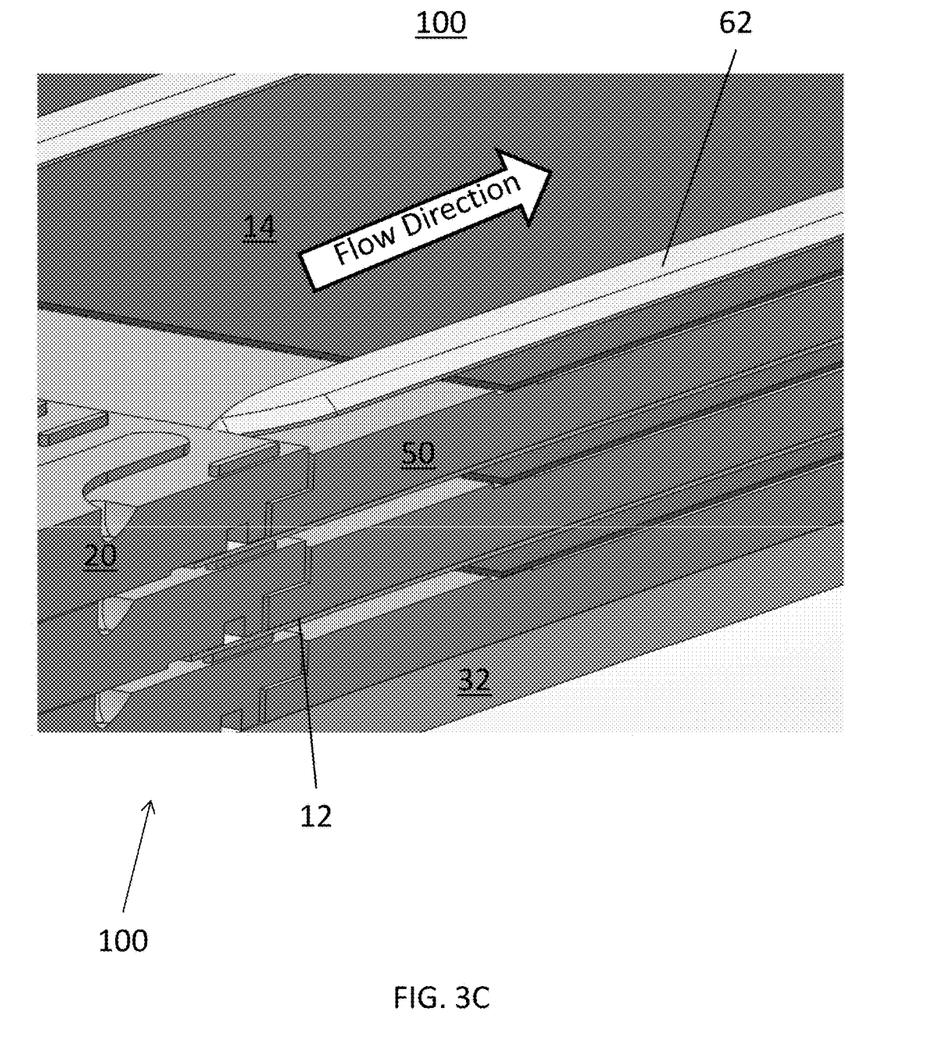
Figure 3D:
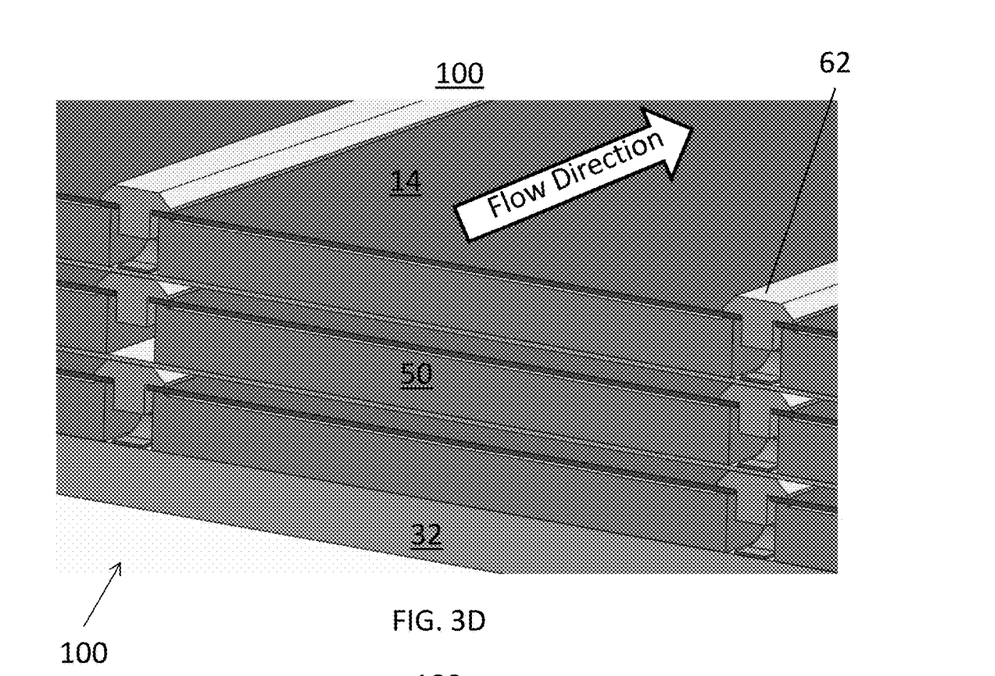
FIG. 3D is a partial sectional view taken along lines D in FIGS. 2B and 3B perpendicular to the flow direction and through junction holes of an insert of the stack of FIG. 3A.
Figure 3E:
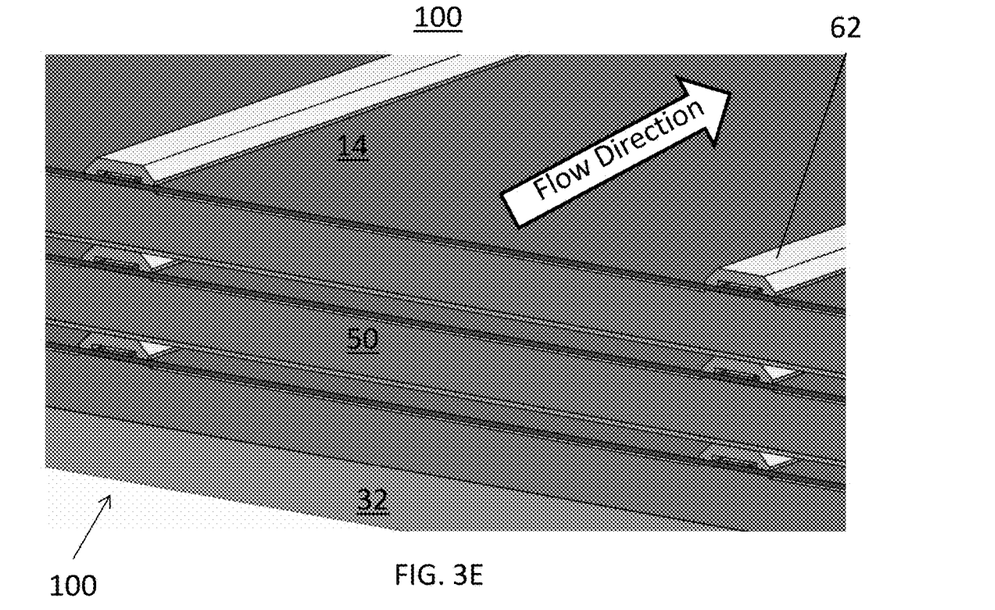
FIG. 3E is a sectional view taken along lines E in FIGS. 2B and 3B perpendicular to the flow direction and between junction holes of the insert.

FIG. 3A is a sectional view of a stack 100 of the flow battery cells 10 of FIG. 2A, according to various embodiments of the present disclosure. FIG. 3B is a sectional view taken parallel to an electrolyte flow direction and through ribs 62 of the stack 100, and FIG. 3C partial sectional view taken parallel to an electrolyte flow direction and through a reaction zone 18 formed between adjacent ribs 62 of the stack 100. FIG. 3D is a partial sectional view taken perpendicular to the flow direction and through junction holes 54 of the insert 50, and FIG. 3E is a sectional view taken perpendicular to the flow direction and between junction holes 54 of the insert 50.

Referring to FIG. 3A, the stack 100 may include flow battery cells 10 stacked on one another, an upper plate 30, and a lower plate 32. In FIG. 3A, the ribs 62 between the first and second electrodes 12, 14 of each cell 10 and the conductive connectors 60 between adjacent cells 10 have been omitted to better illustrate electrolyte flow, as discussed below. While the stack 100 is shown to include four flow battery cells 10, any suitable number of flow battery cells 10 may be included in the stack 100.

Each flow battery cell 10 may include reaction zones 18 formed between the first and second electrodes 12, 14. The ribs 62 (see FIG. 2B) may form sidewalls of the reaction zones 18 (e.g., may separate adjacent reaction zones 18). The reaction zones 18 may operate as channels through which electrolyte flows across the upper surface of the second electrode 14. Since the opposing outer edges of the second electrode 14 are covered by the outermost ribs 62A, the outermost ribs 62A may prevent undesired reaction zones from being formed on the opposing outer edges of the second electrode 14. Separation zones 19 may be formed between adjacent flow battery cells 10, e.g., between the second electrodes 14 and sloped surfaces of the channels 52 of the inserts 50. In other words, the sloped channels 52 form the separation zones 19 between adjacent flow battery cells 10.

The stack 100 may include an inlet manifold 112 and an outlet manifold 114. The channels 52 may be sloped such that a depth of the channels 52 increases as proximity to the cell outlet manifolds 28 increases. In other words, a cross-sectional volume of the separation zones 19 may increase as the separation zones 19 approach the outlet manifold 114. The inlet manifold 112 may include a stack inlet conduit 22 and cell inlet manifolds 26 fluidly connected thereto. The outlet manifold 114 may include a stack outlet conduit 24 and cell outlet manifolds 28 fluidly connected thereto. The cell inlet manifolds 26 may be fluidly connected to the reaction zones 18. The cell outlet manifolds 28 may be fluidly connected to the reaction zones 18 and the separation zones 19. The cell inlet and outlet manifolds 26, 28 may be channels, recesses, or grooves formed in upper and/or lower surfaces of one or more of the cell frames 20.

The stack 100 may include gaskets 34 disposed between the frames 20. The gaskets 34 may seal the frames 20 and/or the manifolds 112, 114, to prevent leakage of electrolyte. The gaskets 34 may also facilitate proper compression of the stack 100.

Electrolyte may flow in the direction of the arrows of FIG. 3A. In particular, the electrolyte may flow through the stack inlet conduit 22, the cell inlet manifolds 26, and into the reaction zones 18. In other words, the electrolyte may flow through the inlet manifold 112 and into the reaction zones 18 of each cell. Substantially all of a first phase of the electrolyte may flow through the reaction zones 18, rather than the separation zones 19. A second phase of the electrolyte may flow through the through holes 15 of the second electrodes 14 and into the separation zones 19. However, some of the second phase may remain in the reaction zones 18, below the first phase. The first phase may include a relatively light zinc halide (e.g., aqueous zinc bromine and/or zinc chloride phase), and the second phase may include a relatively heavy bromine complex (e.g., an organic bromine complex phase).

The electrolyte may flow through the reaction and separation zones 18, 19 and then into the outlet manifold 114. In particular, the electrolyte may flow into the cell outlet manifolds 28 and then into the stack outlet conduit 24. The sloped channels 52 of the inserts 50 are configured to control the amount of electrolyte that flows through the second electrodes 14 and into the separation zones 19. In other words, the separation zones 19 slope downwards in the electrolyte flow direction from the inlet manifold 112 to the outlet manifold 114. The electrolyte from the reaction and separation zones 18, 19 may be recombined in the stack, such as in the cell outlet manifold 28, rather than in separate conduits disposed outside of the stack 100.

For example, the inserts 50 may be configured such that from about 90 to about 70%, such as about 85 to about 75% of the electrolyte flows through the reaction zones 18, and from about 10 to about 30%, such as from about 15 to about 25% of the electrolyte flows into and through the separation zones 19. The relative amounts of electrolyte that flow by and flows through the electrodes 12, 14 may be substantially the same during both a charge and a discharge mode. This is acceptable because the system may operate at a relatively low discharge current density of, for example, 50-100 A/cm$^2$.

Accordingly, the inserts 50 beneficially allow the ratio of electrolyte that flows through the reaction zones 18 and through the separation zones 19 to be controlled, while using the inlet manifold 112 and the outlet manifold 114. In other words, the inserts 50 may take the place of more complicated valving and manifold structures that may otherwise be needed for controlling electrolyte flow. This simplifies external plumbing (e.g., one outlet pipe per stack 100 and no outlet valves required). In other words, valves between the outlet manifold 114 and an electrolyte reservoir may be omitted, and only a single conduit (e.g., pipe) may be used to provide the entire electrolyte output from the stack 100 (e.g., the electrolyte flow through the single outlet manifold 114) in both charge and discharge modes.

During the charge mode the electrolyte provides zinc and bromine ions to the electrodes 12, 14. For example, a voltage may be applied to the first electrode 12, which results in the plating of metallic layers on lower surfaces of the first electrodes 12. The metallic layer may be formed from zinc disposed in the first phase of the electrolyte as zinc bromide. For example, in a zinc-bromide flow battery, during charge mode, zinc of the zinc bromide undergoes a reduction process (e.g., $Zn^{2+}+2e^-\rightarrow Zn$) at the first electrode 12, while the bromine undergoes an oxidation process (e.g., $Br^-\rightarrow Br_2+2e^-$) at the second electrode 14. The process is reversed during the discharge mode, thereby deplating the metal layer and providing an output voltage between the upper and lower plates 30, 32, while using the same electrolyte flow path configuration.

Referring to FIGS. 3B-3E, the ribs 62 may include posts 64 extending there from. The posts 64 may be configured to extend through the junction holes 17 of the second electrode 14 and may be nested in the junction holes 54 of the inserts 50 and over recessed portions of the conductive connectors 60. The posts 64 may be configured to lock the ribs 62 in position and thereby prevent/reduce bending of the ribs 62. The configuration of the ribs 62 allows the ribs 62 to be independent of the cell frames 20. As such, the manufacturing costs and complexity of the cell frames 20 is significantly reduced.

The ribs 62 may be configured to separate the first and second electrodes 12, 14 in each cell 10. As such, the ribs 62 may allow for the formation of the reaction zones 18 (see, FIG. 3A) and may divide each reaction zone 18 into electrolyte flow channels (e.g., "swim lanes"). As such, electrolyte provided from the inlet manifold 112 uniformly flows across the upper surfaces of the second electrodes 14 (e.g., through the reaction zones 18).

The frames 20 and the inserts 50 may have corresponding stepped edges. Accordingly, the frames 20 and inserts 50 may be configured to interlock with one another to insure a secure connection therebetween.

Figure 4:
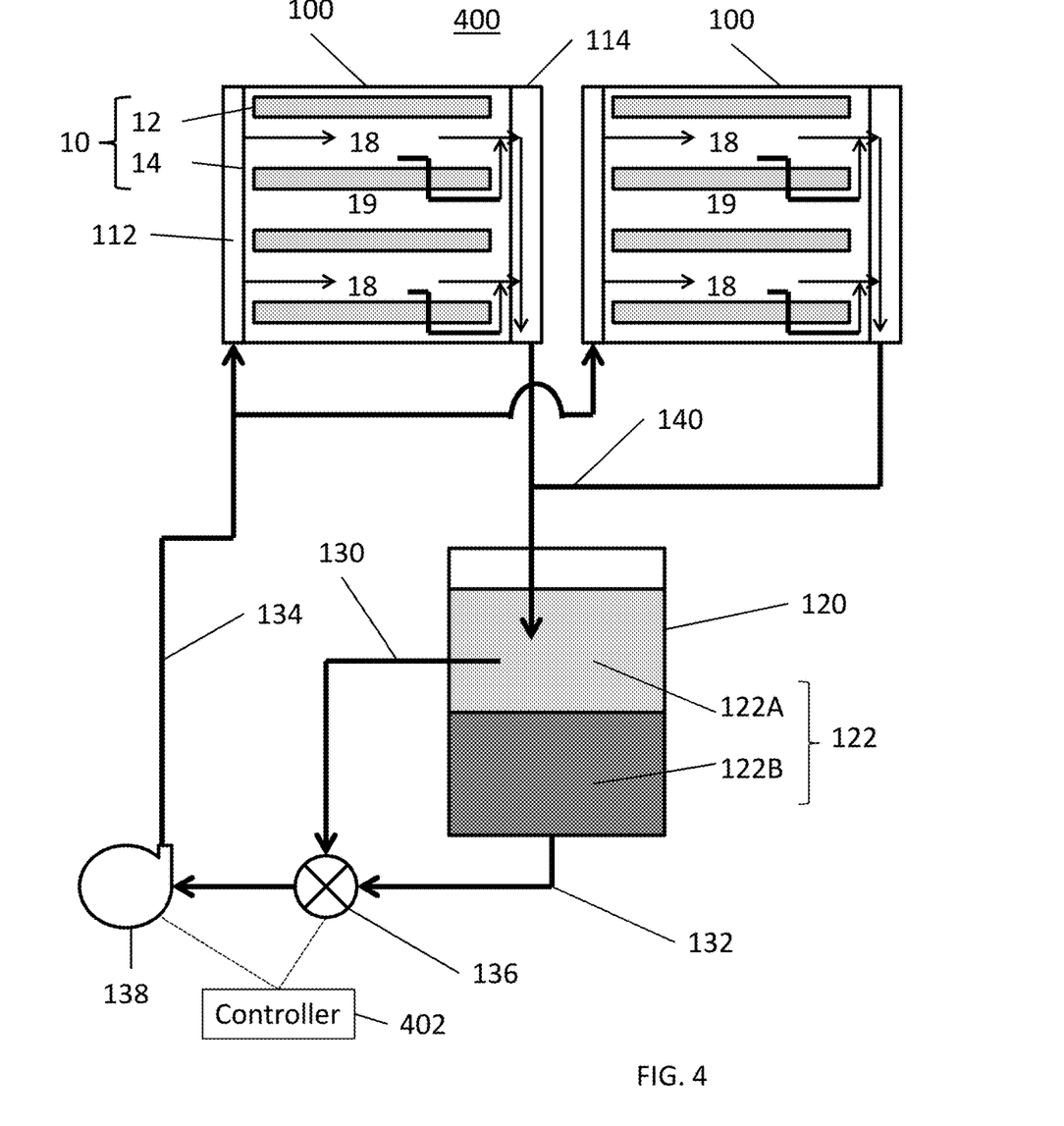
FIG. 4 is a schematic view of a flow battery system 400, according to various embodiments of the present disclosure.

FIG. 4 is a schematic view of a flow battery system 400, according to various embodiments of the present disclosure. Referring to FIG. 4, the system 400 includes two stacks 100, a pump 138, and an electrolyte reservoir 120. However, the present disclosure is not limited to any particular number of stacks 100. For example, the system 400 may include one stack 100, or three or more stacks 100.

The reservoir 120 may made of an insulating material, such as a polymer or glass material and can assume the shape of a polyhedron, cylinder, or sphere. For example, the reservoir may be made of HDPE, polypropylene, PVDF, Teflon, borosilicate glass, and/or aluminosilicate glass.

The system 400 may include an electrolyte 122 disposed in the reservoir 120. The electrolyte 122 may form a first phase 122A and a second phase 122B. The first phase 122A may include a lighter metal-halide electrolyte (e.g., aqueous zinc bromide). The second phase 122B may include a concentrated halogen reactant (e.g., non-aqueous sequestered bromine, i.e., organic bromine complex). The first phase 122A may provide a reaction material during a charge mode of the system 400. The non-aqueous second phase 122B may act as a sequestering agent for the chemical reactions during the charge mode and may provide a reaction material source during the discharge mode.

The system 400 may include first, second, and third inlet conduits 130, 132, 134, which may be collectively referred to as a "system inlet conduit". Herein, a "conduit" may refer to a pipe, manifold, or the like. The first inlet conduit 130 is configured to supply the first phase 122A to a valve 136 or directly to the pump 138. For example, an inlet end of the first inlet conduit 130 may be disposed in the first phase 122A in a middle or top portion of the reservoir 120. The second inlet conduit 132 is configured to supply the second phase 122B to the valve 136. For example, an inlet end of the second inlet conduit 132 may be disposed in the second phase 122B in a bottom portion the reservoir 120. The valve 136 is connected to the pump 138 and may be configured to selectively control the flow of the first and/or second phases 122A, 122B through the first and second inlet conduits 130, 132. In other words, the valve 136 may operate to control the relative amounts of the first and second phases 122A, 122B that are supplied to the stack 100. Herein, the first, second, and third inlet conduits 130, 132, 134, the valve 136, and the pump 138 may be collectively referred to as an "inlet conduit system".

For example, in the charge mode, the valve 136 may close the second inlet conduit 132 and open the first inlet conduit 130, such that only the first phase 122A is supplied to the pump 138. In the discharge mode, the valve 136 may open the second inlet conduit 132 and the first inlet conduit 130, such that both phases 122A, 122B may be provided to the stack 100. According to some embodiments, the both phases 122A, 122B may be supplied to stack 100 during the discharge mode and the charge mode. In other embodiments, relative amounts of the first and second phases 122A, 122B may be controlled during charge and discharge modes. For example, relatively more of the first phase 122A and relatively less of the second phase 122B may be provided to the stack 100 during the charge mode, and relatively less of second phase 122B and relatively more of the first phase 122A may be provided to the stack 100 during the discharge mode.

In the alternative, the valve 136 may be disposed on only the second inlet conduit 132, such that the first inlet conduit 130 may be unvalved. Therefore, when the pump 138 operates, the first phase 122A continuously flows through the first inlet conduit 130, while flow of the second phase 122B through the second inlet conduit 132 is controlled (e.g., permitted or prevented) by the valve 136.

The pump 138 is connected to the stacks 100 by the third inlet conduit 134. The pump 138 may any type of pump suitable for pumping the electrolyte 122 to the stacks 100 through the third inlet conduit 134. For example, the pump 138 may be a centrifugal pump according to some embodiments.

The stacks 100 may each include an inlet manifold 112, an outlet manifold 114, and flow battery cells 10. The flow battery cells 10 may be horizontally positioned, and may be stacked vertically and connected in series. The flow battery cells 10 include first electrodes 12 and second electrodes 14, which are separated by reaction zones 18 and separation zones 19.

The inlet manifolds 112 may be configured to receive the electrolyte 122 from the third inlet conduit 134 and supply the electrolyte 122 to the reaction zones 18. The outlet manifold 114 may be configured to receive the electrolyte 122 from the reaction zones 18 and the separation zones 19, and supply the electrolyte to a return conduit 140.

The return conduit 140 may be configured to transport the electrolyte 122 from the stacks 100 to the reservoir 120. In particular, an outlet end of the return conduit 140 may be disposed in the first phase 122A.

The flow battery system 400 may include one or more controllers 402, which may be used, for example, for controlling a rate of the pump 138. The controller 402 may be a digital or analog circuit, or may be a computer. According to alternative embodiments, substantially equal amounts of the first and second phases 122A and 122B may be supplied during both charge and discharge modes. In this case, the valve 136 may be omitted.

The use of two stacks 100 in the system 400 provides for higher voltage and total energy output, as compared to a system including only one stack 100. Further this configuration also provides for a lower price per kWh, as compared to the use of two systems containing single stacks, since the dual stack system 400 may have comparatively fewer power electronics, sensors, auxiliaries, etc., as compared to two single-stack systems.

According to other embodiments, during the charge mode, the valve 136 may be adjusted (e.g., closed) such that more of the first phase 122A is supplied to the stack 100 than the second phase 122B. In some embodiments, substantially all of the electrolyte 122 supplied during the charge mode may be the first phase 122A. During the discharge mode, the valve 136 may be adjusted (e.g., opened) such the first and second phases 122A, 122B are both supplied to the stack 100. However, according to some embodiments, more of the second phase 122B is supplied to the stack 100 than the first phase 122A, during the discharge mode.

Accordingly, the system 400 may be operated by flowing the electrolyte 122 along the flow path described above, e.g., the same flow path, during both the charge mode and discharge mode.

The present disclosure utilizes a biphasic mixture for an electrolyte, which enables use of a single flow path and pump to provide the material needed for both the anode and cathode. The separation by gravity prevents auto-discharge that may be encountered by flow-batteries that do not have membrane separator. The single flow path design simplifies the physical design of the battery and reduces costs by requiring fewer auxiliary components, such as pumps, separator membranes, and flow meters. Furthermore, the lack of a barrier means that maintenance costs are reduced.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A flow battery bipolar electrode assembly comprising:
an impermeable first electrode;
an insert disposed on the first electrode and comprising sloped channels;
a cell frame disposed around the insert and comprising a cell inlet manifold configured to provide a metal halide electrolyte and an opposing cell outlet manifold configured to receive the electrolyte;
a porous second electrode disposed on the insert such that sloped separation zones are formed between the second electrode and the channels;
connectors electrically connecting the first and second electrodes; and
ribs disposed on the second electrode and extending substantially parallel to the channels of the insert,
wherein a depth of the channels increases as proximity to the cell outlet manifold increases.

2. The assembly of claim 1, wherein the insert and the second electrode are configured such that from about 10% to about 30% of the provided electrolyte passes through the second electrode and enters the separation zones, before being received by the cell outlet manifold, and a remainder of the electrolyte remains above the second electrode before being received by the cell outlet manifold.

3. The assembly of claim 1, wherein the ribs comprise posts that extend through overlapped junction holes formed in the second electrode and the insert.

4. The assembly of claim 3, wherein the connectors are corrugated strips inserted into the overlapped junction holes formed in the second electrode and the insert.

5. The assembly of claim 1, wherein the ribs are configured to physically separate the second electrode and a first electrode of an adjacent assembly, such that reaction zones are formed between the second electrode and the first electrode of a flow battery cell.

6. The cell of claim 1, wherein the connectors are stake welded to the first and second electrodes.

7. The assembly of claim 1, wherein:
the second electrode comprises a metal plate having through holes; and
at least one of the connectors, the first electrode, and the second electrode comprises a material independently selected from coated steel, graphite, titanium, tantalum, niobium, or any combination thereof.

8. The assembly of claim 1, wherein the insert comprises a dielectric material.

9. The assembly of claim 1, wherein the connectors comprise:
substantially flat upper contact regions that are welded to the upper surface of the second electrode;
substantially flat lower contact regions that are welded to the upper surface of first electrode; and
bent regions that extend through overlapped junction holes in the second electrode and in the insert to connect the upper and lower contact regions.

10. The assembly of claim 1, wherein:
the ribs are configured to form reaction zones through which the electrolyte flows along the upper surface of the second electrode; and
an outermost two of the ribs are configured to form outer edges of an outermost two of the reaction zones.

11. A flow battery stack, comprising:
assemblies of claim 1 vertically stacked on one another to form a plurality of flow battery cells;
an upper plate disposed on an uppermost one of the cells;
a lower plate disposed under a lowermost one of the cells;
a stack inlet conduit configured to provide the electrolyte to the cell inlet manifolds; and
a stack outlet conduit fluidly configured to receive the electrolyte from the cell outlet manifolds,
wherein the ribs are configured to physically separate the first and second electrodes of each flow battery cell, such that reaction zones are formed between the first and second electrodes of each flow battery cell.

12. The flow battery stack of claim 11, wherein:
the lowermost second electrode in the stack is connected to the lower plate; and
an upper most first electrode in the stack is connected to the upper plate.

13. The flow battery stack of claim 11, wherein the ribs do not vertically overlap the channels of the spacers.

14. The flow battery stack of claim 11, wherein the connectors are corrugated and are configured to be inserted into junction holes formed in the inserts.

15. The flow battery stack of claim 11, wherein the reaction zones do not comprise a membrane separator.

16. A flow battery system comprising:
a reservoir comprising a metal halide electrolyte;
a first flow battery stack of claim 11;
a second flow battery stack of claim 11;
an inlet conduit fluidly connecting the reservoir to inlet conduits of the first and second stacks;
an outlet conduit fluidly connecting the reservoir to outlet conduits of the first and second stacks; and
a pump configured to pump the electrolyte through the first inlet conduit.

17. A flow battery bipolar electrode assembly comprising:
an insert comprising junction holes;
an impermeable first electrode disposed under the insert;
a porous second electrode disposed over the insert and comprising junction holes that overlap with the junction holes of the insert;
a cell frame disposed around the insert and comprising a cell inlet manifold configured to provide a metal halide electrolyte and an opposing cell outlet manifold configured to receive the electrolyte; and
corrugated connectors disposed on the second electrode and contacting the first electrode through the overlapped junction holes of the insert and second electrode, such that the first and second electrodes are electrically connected;

wherein the connectors each comprise:
upper contact regions disposed directly on the upper surface of the second electrode;
lower contact regions disposed directly on the upper surface of the first electrode; and
bent regions that extend through the overlapped junction holes and connect the upper and lower contact regions.

18. The assembly of claim 17, wherein:
the upper contact regions are stake welded to the second electrode; and
the lower contact regions are stake welded to the first electrode.

19. The assembly of claim 17, wherein:
the upper contact regions are stake welded to contact regions of the second electrode that are disposed between the junction holes of the second electrode; and
the lower contact regions are stake welded to contact regions of the first electrode that overlap with the junction holes of the second electrode and the insert.

20. The assembly of claim 19, wherein:
the contact regions of the second electrode are disposed between corresponding junction holes of the second electrode; and
the contact regions of the first electrode face corresponding junction holes of the insert.

21. The assembly of claim 17, wherein the connectors comprise corrugated metal strips.

22. The assembly of claim 17, further comprising ribs disposed on the second electrode and comprising posts that are disposed in the overlapped junction holes.

23. A flow battery bipolar electrode assembly comprising:
an insert comprising junction holes;
an impermeable first electrode disposed under the insert;
a porous second electrode disposed over the insert and comprising junction holes that overlap with the junction holes of the insert;
a cell frame disposed around the insert and comprising a cell inlet manifold configured to provide a metal halide electrolyte and an opposing cell outlet manifold configured to receive the electrolyte;
corrugated connectors disposed on the second electrode and contacting the first electrode through the overlapped junction holes of the insert and second electrode, such that the first and second electrodes are electrically connected; and
ribs disposed on the second electrode and comprising posts that are disposed in the overlapped junction holes;
wherein the connectors each comprise:
upper contact regions disposed directly on the upper surface of the second electrode;
lower contact regions disposed directly on the upper surface of the first electrode; and bent regions that extend through the overlapped junction holes and connect the upper and lower contact regions.

* * * * *